(12) United States Patent
Shiau

(10) Patent No.: US 11,624,384 B2
(45) Date of Patent: Apr. 11, 2023

(54) PLATE-TO-PLATE CONNECTING STRUCTURE

(71) Applicant: SY-THERMAL INC., New Taipei (TW)

(72) Inventor: Fuh-Yuarn Shiau, New Taipei (TW)

(73) Assignee: SY-THERMAL INC., New Taipei (TW)

( * ) Notice: Subject to any disclaimer, the term of this patent is extended or adjusted under 35 U.S.C. 154(b) by 522 days.

(21) Appl. No.: 16/517,368

(22) Filed: Jul. 19, 2019

(65) Prior Publication Data
US 2021/0018025 A1     Jan. 21, 2021

(51) Int. Cl.
*F16B 5/00*     (2006.01)

(52) U.S. Cl.
CPC .................. *F16B 5/0056* (2013.01)

(58) Field of Classification Search
CPC .......... F16B 2001/0078; F16B 2200/30; F16B 5/0056; F16B 5/0084; F16B 5/0096; F16B 5/0012; F16B 5/04; Y10T 403/21; Y10T 403/213; Y10T 403/217; Y10T 403/7045
USPC ...................... 403/28, 29, 30, 364
See application file for complete search history.

(56) References Cited

U.S. PATENT DOCUMENTS

| | | | | |
|---|---|---|---|---|
| 732,389 A | * | 6/1903 | Wheater | E04B 1/2604 403/258 |
| 2,829,742 A | * | 4/1958 | Wallace | F42B 5/05 89/14.3 |
| 3,591,212 A | * | 7/1971 | Rhyne | F16B 12/46 217/65 |
| RE33,454 E | * | 11/1990 | Potter | E02F 3/60 37/398 |
| 5,052,158 A | * | 10/1991 | D'Luzansky | F16B 17/008 52/177 |
| 5,432,989 A | * | 7/1995 | Turek | B21D 39/031 29/243.5 |
| 6,073,929 A | * | 6/2000 | Nahon | A63F 9/1208 273/156 |
| 2007/0289248 A1 | * | 12/2007 | Schmitz | B64C 9/02 52/631 |

(Continued)

FOREIGN PATENT DOCUMENTS

GB          2221273 A  *  1/1990  ............... F16B 3/00

*Primary Examiner* — Michael P Ferguson
*Assistant Examiner* — Zachary A Hall
(74) *Attorney, Agent, or Firm* — Chun-Ming Shih; HDLS IPR Services

(57) ABSTRACT

A plate-to-plate connecting structure includes a first plate piece and a second plate piece. The first plate piece and the second plate piece have a first concave/convex connecting side and a second concave/convex connecting side connected with a corresponding concave/convex means; the first concave/convex connecting side has a first top edge and a second bottom edge, and the second concave/convex connecting side has a second top edge and a second bottom edge; the first top edge and the first bottom edge have top concave parts and bottom concave parts; the second top edge and the second bottom edge have top convex parts and bottom convex parts; the top convex parts are protruded into the corresponding top concave parts for forming a mutual blocking status; and the bottom convex parts are protruded into the corresponding bottom concave parts for forming the mutual blocking status.

6 Claims, 14 Drawing Sheets

(56) References Cited

U.S. PATENT DOCUMENTS

2009/0229105 A1* 9/2009 Schubetzer .......... F16B 5/0056
29/445

* cited by examiner

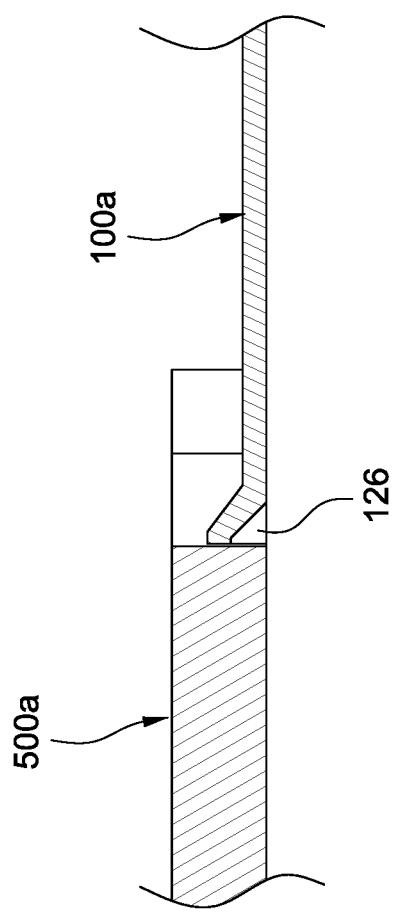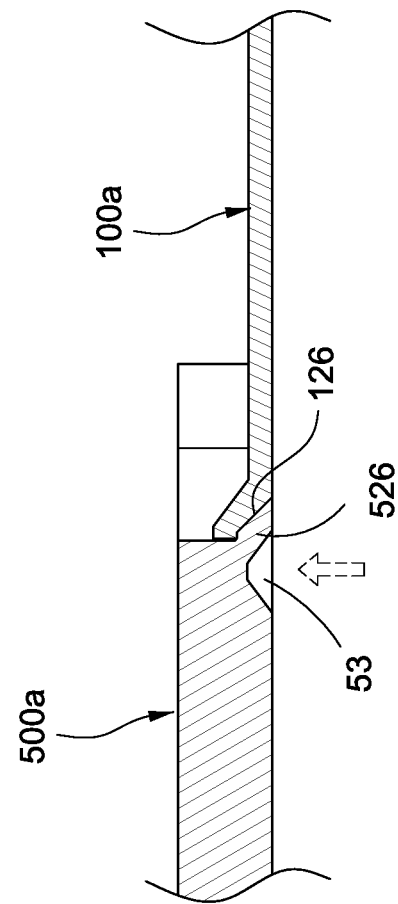

PLATE-TO-PLATE CONNECTING STRUCTURE

BACKGROUND OF THE INVENTION

Field of the Invention

The present invention relates to a substrate, especially to a plate-to-plate connecting structure

Description of Related Art

In a field for connecting two plate pieces (for example heat dissipation plate pieces) made of different material, requirements of heat conduction or disposing at least one heat pipe need to be satisfied for achieving an optimal heat dissipation effect, wherein a plate piece made of copper is the best option. However, since the cost of copper is expensive, connecting means for connecting a smaller plate piece made of copper and another larger plate piece made of other cheaper metals for forming a complete heat dissipation plate is provided.

One of the connecting means is that anyone or each surface of two corresponding surfaces between the larger plate piece and the smaller plate piece is provided with a mylar sheet. This connecting means may achieve a connecting effect in a length and a width directions (X axis and Y axis), but a disadvantage of being easily bent in a height direction (Z axis) and released is caused.

Another connecting means is that one side of the larger plate piece and one side of the smaller plate piece are mutually stacked then fastened. This connecting means has advantages of having a good structural strength and capable of being connected in the length, the width and the height directions (X axis, Y axis and Z axis) and preventing from being released. However, the thickness after the two plate pieces are stacked is increased and an effect of allowing a finished product to be thinned cannot be achieved; moreover, a height differentiation is generated, thus an electric layout of electronic components is affected.

SUMMARY OF THE INVENTION

The present invention is to provide a plate-to-plate connecting structure, which has advantages of enabling a first concave/convex connecting side of a first plate piece and a second concave/convex connecting side of a second plate piece to be mutually and stably connected, so that the plate pieces can be stably connected and prevented from being released in a length, a width and a height directions.

The present invention is to provide a plate-to-plate connecting structure, which has advantages of enabling a first plate piece and a second plate piece to be assembled and connected, and effects of easy in manufacturing process and increasing a yield rate are also provided.

Accordingly, the present invention provides a plate-to-plate connecting structure, which includes a first plate piece, having a first concave/convex connecting side, wherein the first concave/convex connecting side has a first top edge and a first bottom edge corresponding to a top surface and a bottom surface of the first plate piece, respectively, the first top edge and the first bottom edge have a plurality of top concave parts and a plurality of bottom concave parts, respectively; and a second plate piece, having a second concave/convex connecting side, wherein the second concave/convex connecting side and the first concave/convex connecting side are connected with a corresponding concave/convex means, the second concave/convex connecting side has a second top edge and a second bottom edge corresponding to a top surface and a bottom surface of the second plate piece, respectively, the second top edge and the second bottom edge have a plurality of top convex parts and a plurality of bottom convex parts, respectively, each of the top convex parts is protruded into each of the corresponding top concave parts for forming a mutual blocking status, and each of the bottom convex parts is protruded into each of the corresponding bottom concave parts for forming the mutual blocking status.

Accordingly, the present invention provides a plate-to-plate connecting structure, which includes a first plate piece, having a first concave/convex connecting side, wherein the first concave/convex connecting side has a first top edge corresponding to a top surface of the first plate piece, the first top edge has a plurality of first convex parts and a plurality of first convex parts; and a second plate piece, having a second concave/convex connecting side, wherein the second concave/convex connecting side and the first concave/convex connecting side are connected with a corresponding concave/convex means, the second concave/convex connecting side has a second top edge corresponding to a top surface of the second plate piece, the second top edge has a plurality of second convex parts and a plurality of second concave parts, each of the second convex parts is protruded into each of the corresponding first concave parts for forming a mutual blocking status, and each of the first convex parts is protruded into each of the corresponding second concave parts for forming the mutual blocking status.

Accordingly, the present invention provides another plate-to-plate connecting structure, which includes a first plate piece, having a first concave/convex connecting side, wherein the first concave/convex connecting side has a first bottom edge corresponding to a bottom surface of the first plate piece, the first bottom edge has a plurality of bottom concave parts; and a second plate piece, having a second concave/convex connecting side, wherein the second concave/convex connecting side and the first concave/convex connecting side are connected with a corresponding concave/convex means, the second concave/convex connecting side has a second top edge and a second bottom edge corresponding to a top surface and a bottom surface of the second plate piece, respectively, the second top edge and the second bottom edge have a plurality of top convex parts and a plurality of bottom convex parts, respectively, each of the bottom convex parts is protruded into each of the corresponding bottom concave parts for forming a mutual blocking status, and each of the top convex parts is abutted against a top surface of the first plate piece for forming the mutual blocking status.

In comparison with related art, the present invention has preferable features as follows. The first plate piece and the second plate piece connected with a plate-to-plate connecting means can be stably connected and prevented from being released in a length, a width and a height directions; and advantages of enabling the first plate piece and the second plate piece to be easy in manufacturing process and a yield rate to be increased are also provided.

BRIEF DESCRIPTION OF DRAWING

FIG. 13 is a partial cross-sectional view showing the initial assembly wherein a part thereof yet being in the mutual blocking status according to the third embodiment of the present invention;

FIG. 14 is a partial cross-sectional view of FIG. 13 being in the mutual blocking status according to the present invention.

DETAILED DESCRIPTION OF THE INVENTION

Figure 1:
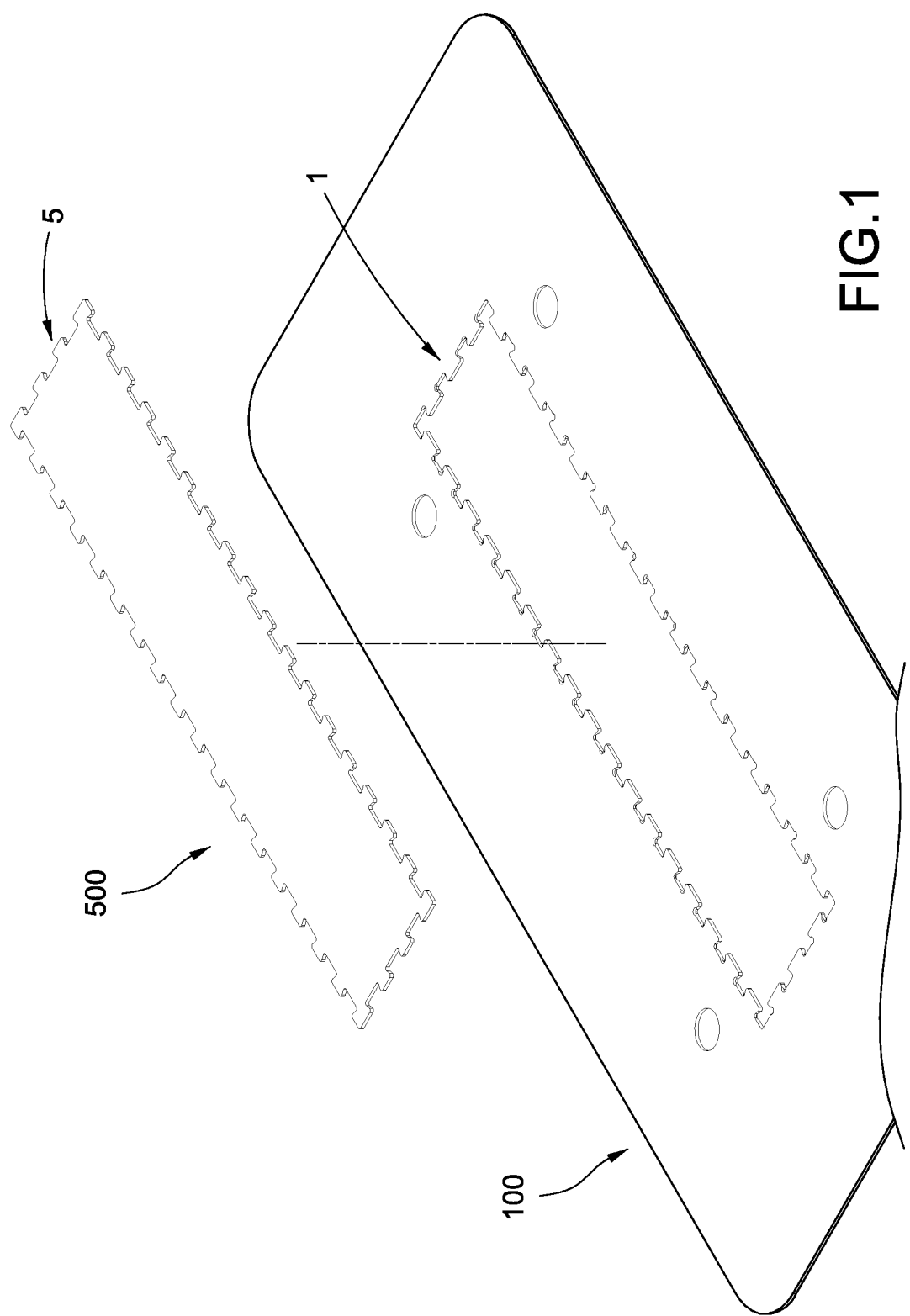
FIG. 1 is a perspective exploded view according to a first embodiment of the present invention.

Preferred embodiment of the present invention will be described with reference to the drawings.

The present invention provides a plate-to-plate connecting structure, which is used for connecting two plates made of different materials so as to be connected for forming as a complete substrate (for example a heat dissipation substrate or another substrate for the purposes other than heat dissipation). The plate-to-plate connecting structure provided by the present invention is not limited to be applied to any certain product as long as a substrate being formed through connecting plates is required. According to this embodiment, a heat dissipation substrate which is commonly needed for allowing at least one heat dissipation member or at least one heat source to be disposed thereon is adopted for providing a clear disclosure. Please refer from FIG. 1 to FIG. 5, which disclose a first embodiment provided by the present invention; please refer from FIG. 6 to FIG. 9, which disclose a second embodiment provided by the present invention; and please refer from FIG. 10 to FIG. 15, which disclose a third embodiment provided by the present invention, Referring FIG. 1 to FIG. 5, according to the first embodiment provided by the present invention, the plate-to-plate connecting structure includes a first plate piece 100 and a second plate piece 500 having a same thickness. A top surface and a bottom surface (oppositely arranged and not labeled with indexes) are both formed on the first plate piece 100 and the second plate piece 500. The first plate piece 100 has a first concave/convex connecting side 1, and the second plate piece 500 has a second concave/convex connecting side 5. The first concave/convex connecting side 1 and the second concave/convex connecting side 5 can be formed as a linear connecting side (not shown in figures), a bent connecting side (for example being bent to a L-shaped or Z-shaped status but not shown in figures) or an annular connecting side (as shown in FIG. 1); what shall be addressed is that the scope of the present invention is not limited to the aforesaid arrangement, and the annular connecting side is adopted in this embodiment for illustrations.

The first concave/convex connecting side 1 has a first top edge 11 and a first bottom edge 12. The first top edge 11 is corresponding to the top surface of the first plate piece 100, and the first top edge 11 has a plurality of top concave parts 111. The first bottom edge 12 is corresponding to the bottom surface of the first plate piece 100, and the first bottom edge 12 has a plurality of bottom concave parts 121; and each of the top concave parts 111 and each of the bottom concave parts 121 are staggeringly arranged.

The second concave/convex connecting side 5 can be assembled with the concave/convex connecting side 1 by a corresponding concave/convex means (in other words a concave state being assembled with a convex state and vice versa). The second concave/convex connecting side 5 has a second top edge 51 and a second bottom edge 52. The second top edge 51 is corresponding to the top surface of the second plate piece 500, and the second top edge 51 has a plurality of top convex parts 511. The second bottom edge 52 is corresponding to the bottom surface of the second plate piece 500, and the second bottom edge 52 has a plurality of bottom convex parts 521.

Figure 2:
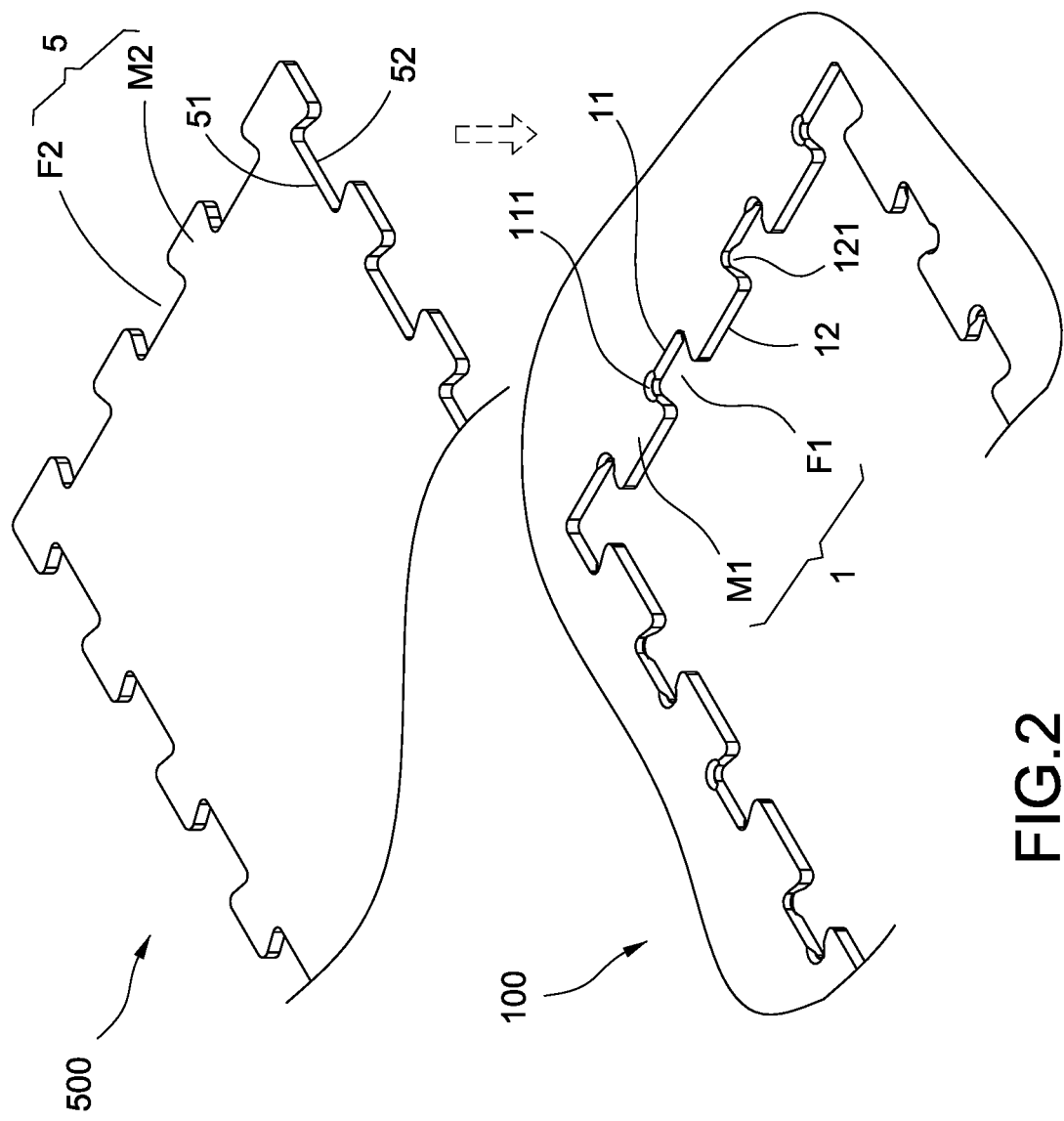
FIG. 2 is a partially enlarged perspective view according to the first embodiment of the present invention.

Substantially speaking and as shown in FIG. 1 and FIG. 2, the first concave/convex connecting side 1 has a plurality of first neck-shrinking male members M1 and a plurality of first neck-shrinking female members F1 which are staggeringly arranged, and the second concave/convex connecting side 5 has a plurality of second neck-shrinking male members M2 and a plurality of second neck-shrinking female members F2 which are staggeringly arranged. The first neck-shrinking male members M1 and the second neck-shrinking male members M2 are neck-shrinking members each having a neck shrinking part, and the first neck-shrinking female members F1 and the second neck-shrinking female members F2 are formed with a corresponding shape for enabling each of the first neck-shrinking male members M1 and each of the second neck-shrinking female members F2 to be correspondingly assembled, and for enabling each of the second neck-shrinking male members M2 and each of the first neck-shrinking female members F1 to be correspondingly assembled, so that the aforesaid corresponding concave/convex assembly can be achieved.

Figure 5:
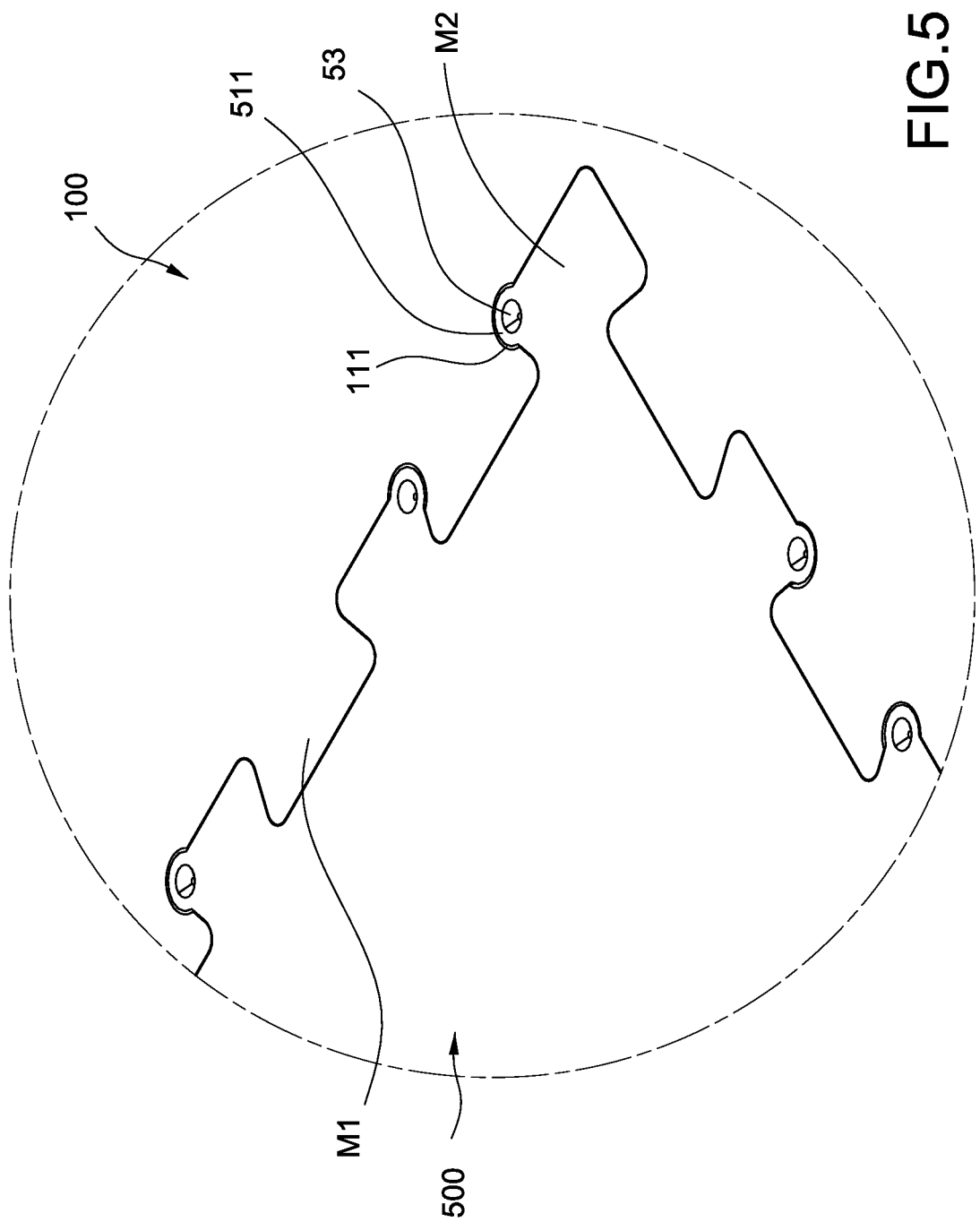
FIG. 5 is a perspective view of FIG. 3 being in the mutual blocking status according to the present invention.

Preferably, the top concave part 111 and the bottom concave part 121 can be disposed at partial locations of the first neck-shrinking male member M1 or partial locations of the first neck-shrinking female member F1; as shown in FIG. 2, the top concave part 111 and the bottom concave part 121 are disposed at two corners of the first neck-shrinking female member F1; the top convex part 511 and the bottom convex part 521 can be disposed at partial locations of the second neck-shrinking male member M2 or partial locations of the second neck-shrinking female member F2; the top convex part 511 and the bottom convex part 521 are disposed at two corners of the second neck-shrinking male member M2, wherein the top convex part 511 and the bottom convex part 521 are respectively arranged on a top surface and a bottom surface of the second neck-shrinking male member M2 (as shown in FIG. 5).

Figure 3:
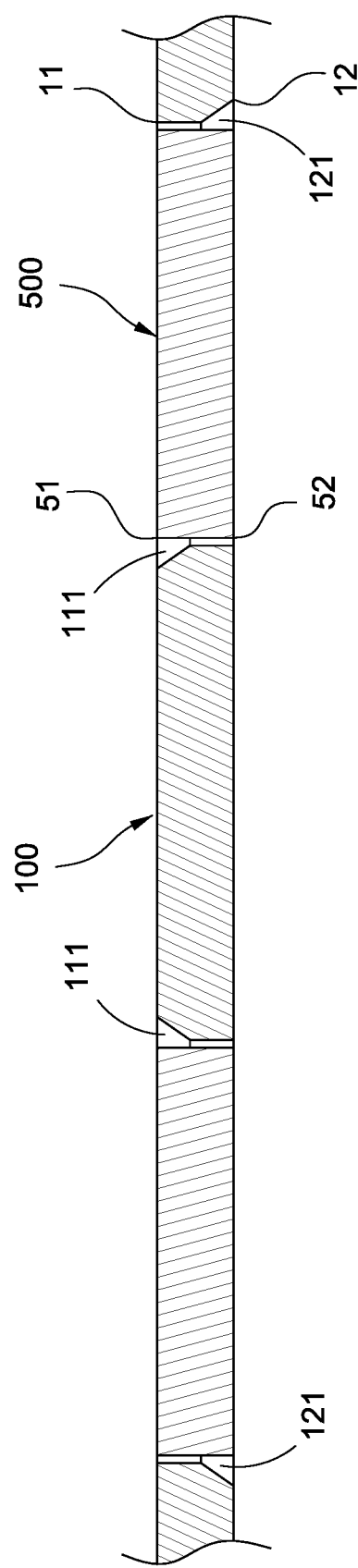
FIG. 3 is a cross sectional view showing an initial assembly before being in a mutual blocking status according to the first embodiment of the present invention.
Figure 4:
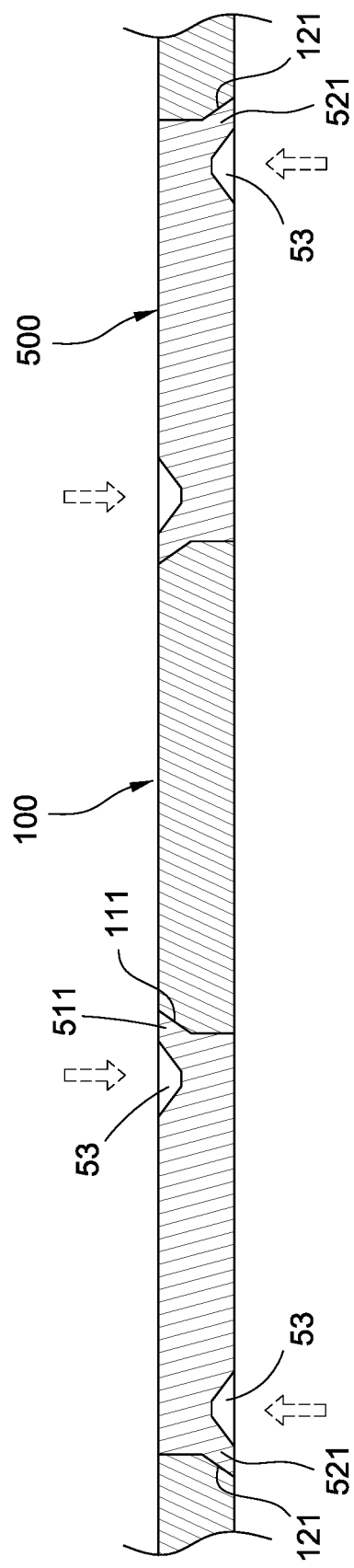
FIG. 4 is a cross sectional view of FIG. 3 being in the mutual blocking status according to the present invention.

As shown from FIG. 3 to FIG. 5, when the second plate piece 500 is downwardly pressed for being connected to corresponding portions of the first plate piece 100, the first concave/convex connecting side 1 and the second concave/convex connecting side 5 are assembled with the corresponding concave/convex connecting means, each of the top convex parts 511 is protruded into each of the corresponding top concave part 111 for forming a mutual blocking status, and each of the bottom convex parts 521 is protruded into each of the corresponding bottom concave parts 121 for forming a mutual blocking status. In other words, the first plate piece 100 is blocked by each of the top convex parts 511 arranged above and each of the bottom convex parts 521 arranged below, so that the first plate piece 100 and the second plate piece 500 can be stably connected.

What shall be addressed is that each of the top concave parts 111 and each of the bottom concave parts 121 are respectively preformed on the first top edge 11 and the first bottom edge 12, so what when a user utilizes a tool to punch the top surface and the bottom surface of the second plate piece 500, a plurality of recessed parts 53 can be formed on the top surface and the bottom surface of the second plate piece 500, and each of the recessed parts 53 can be extruded for forming each of the top convex parts 511 and each of the bottom convex parts 521, so that each of the top convex parts 511 and each of the bottom convex parts 521 are protruded from the second top edge 51 and the second bottom edge 52, and capable of being protruded into the each of the corresponding top concave parts 111 and each of the corresponding bottom concave parts 121.

For allowing the top convex parts 511 and the bottom convex parts 521 to be extruded with a punching means, the second plate piece 500 can be a plate piece having a high extensibility or any other plate piece capable of being formed with corresponding convex parts with the punching means.

Please refer from FIG. 6 to FIG. 9, which disclose the second embodiment provided by the present invention, the structure of the second embodiment is substantially the same as that of the first embodiment, and differences between the second embodiment and the first embodiment are illustrated as follows.

The first top edge 11 of the first plate piece 100 has a plurality of first top concave parts 113 and a plurality of first convex parts 114. The second top edge 51 of the second plate piece 500 has a plurality of second convex parts 513 and a plurality of second concave parts 514.

After being assembled, each of the second convex parts 513 is protruded into each of the corresponding first concave parts 111 for forming a mutual blocking status, and each of the first convex parts 114 is protruded into each of the second concave parts 514 for forming a mutual blocking status. As such, the second plate piece 500 is blocked by the first convex parts 114 and the first concave part 113 which are respectively arranged in a top and a bottom direction, so that the first plate piece 100 and the second plate piece 500 can be stably connected.

Figure 6:
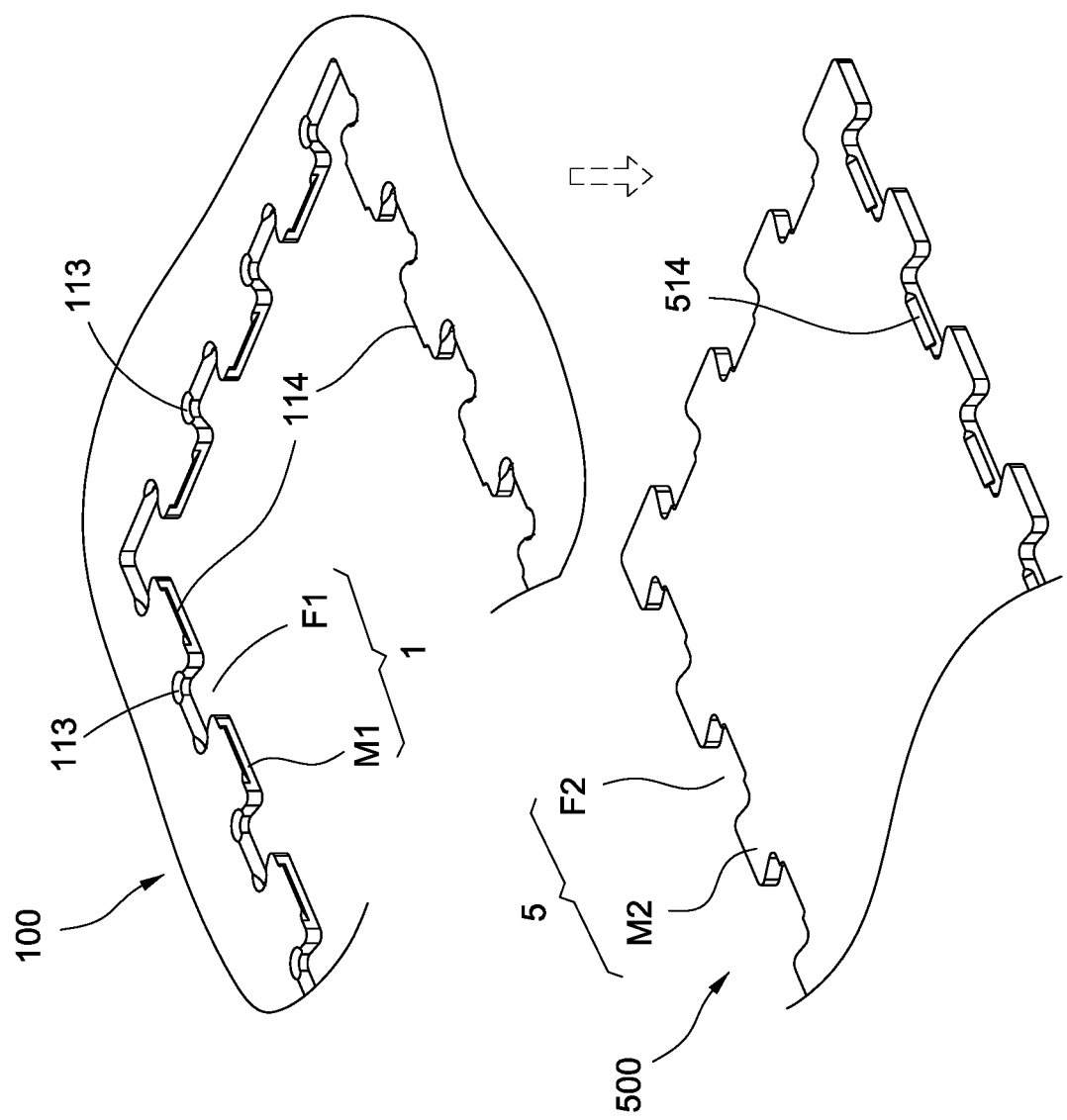
FIG. 6 is a perspective exploded view according to a second embodiment of the present invention.
Figure 7:
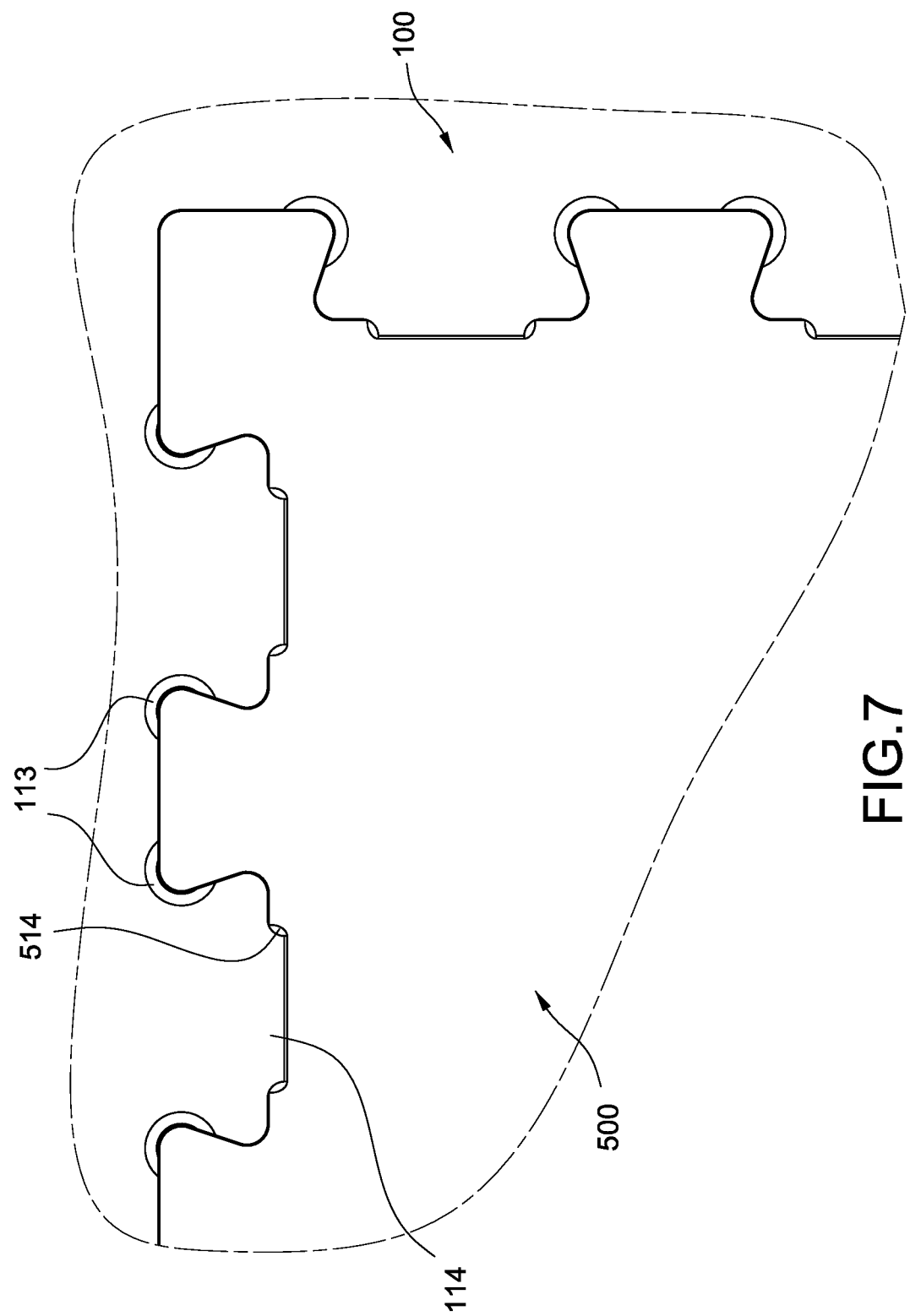
FIG. 7 is a top view showing an initial assembly before being in a mutual blocking status according to the second embodiment of the present invention.
Figure 8:
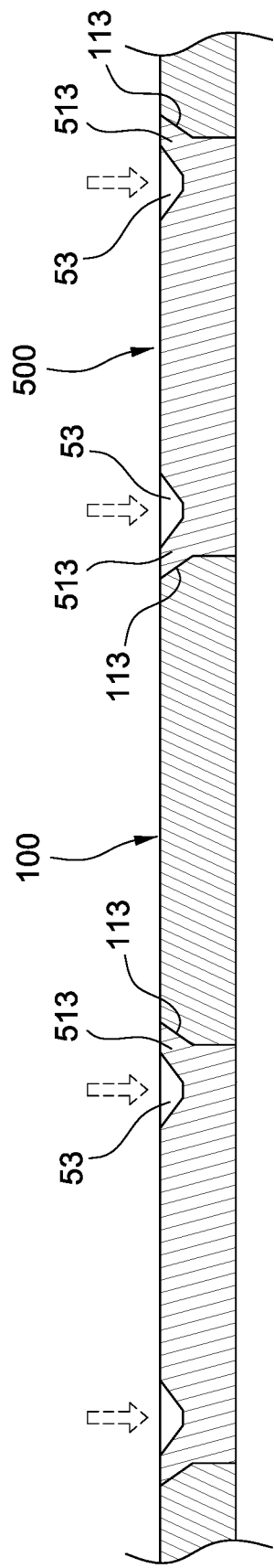
FIG. 8 is a cross sectional view of FIG. 7 being in the mutual blocking status according to the present invention.
Figure 9:
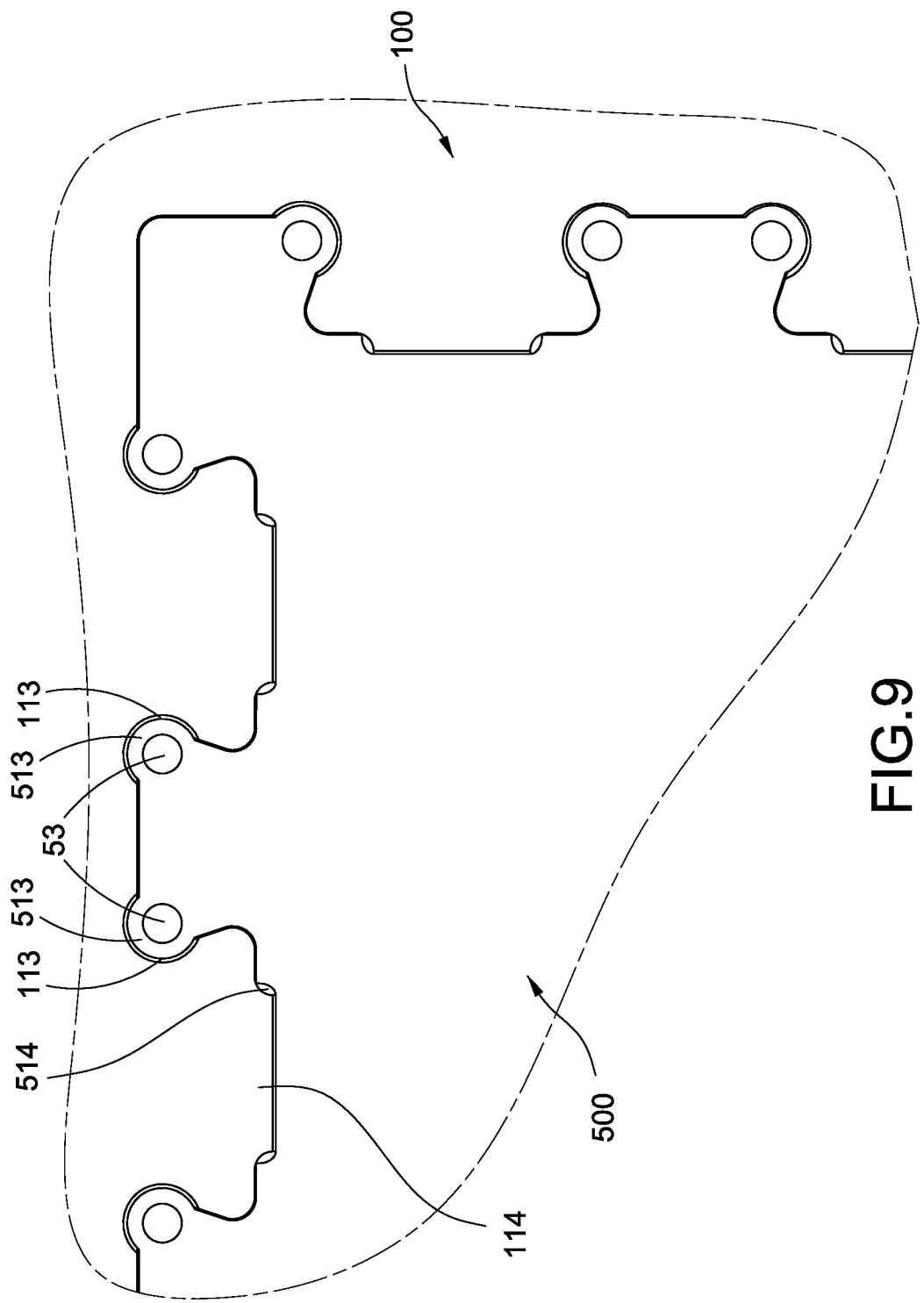
FIG. 9 is a top view of FIG. 8 according to the present invention.

Preferably, the first convex parts 114 can be located at partial locations of the first neck-shrinking male member M1; the first concave parts 113 can be located at partial location of the first neck-shrinking female member F1, as shown in figures, the first concave parts 113 are located at two corners of the first neck-shrinking female member F1 (as shown in FIG. 6 and FIG. 7); the second concave parts 514 can be located at partial locations of the second neck-shrinking female member F2; the second concave parts 513 can be located at partial locations of the second neck-shrinking male member M2, as shown in figures, the second concave parts 513 are located at two corners of the second neck-shrinking male member M2 (as shown in FIG. 9).

What shall be addressed is that each of the first concave parts 113 and each of the second concave parts 514 are respectively preformed at the first top edge 11 (as shown in FIG. 2) and the second top edge (as shown in FIG. 2), and each of the first convex parts 114 is pre-protruded from the first top edge 11, as such, when the user utilizes a tool to punch the top surface of the second plate piece 500, a plurality of the recessed parts 53 (as shown in FIG. 9) are formed on the top surface of the second plate piece 500, and the recessed parts 53 can be extruded for forming each of the corresponding second convex parts 513, thereby allowing each of the second convex parts 513 protruded from the second top edge 51 to be correspondingly protruded into each of the first concave parts 113.

Please refer from FIG. 10 to FIG. 15, which disclose the third embodiment provided by the present invention, the structure of the third embodiment is substantially the same as that of the first embodiment, and differences between the third embodiment and the first embodiment are illustrated as follows.

The thickness of a second plate piece 500a is thicker than the thickness of a first plate piece 100a, so that bottom surfaces of the first plate piece 100a and the second plate piece 500a are mutually aligned, and a top surface of the second plate piece 500a is higher than that of the first plate piece 100a. The first bottom edge 12 of the first plate piece 100a has a plurality of bottom concave parts 126 (as shown in FIG. 10); the second top edge 51 of the second plate piece 500a has a plurality of top convex parts 515 (as shown in FIG. 12), the second bottom edge 52 of the second plate piece 500a has a plurality of bottom convex parts 526 (as shown in FIG. 14).

Figure 12:
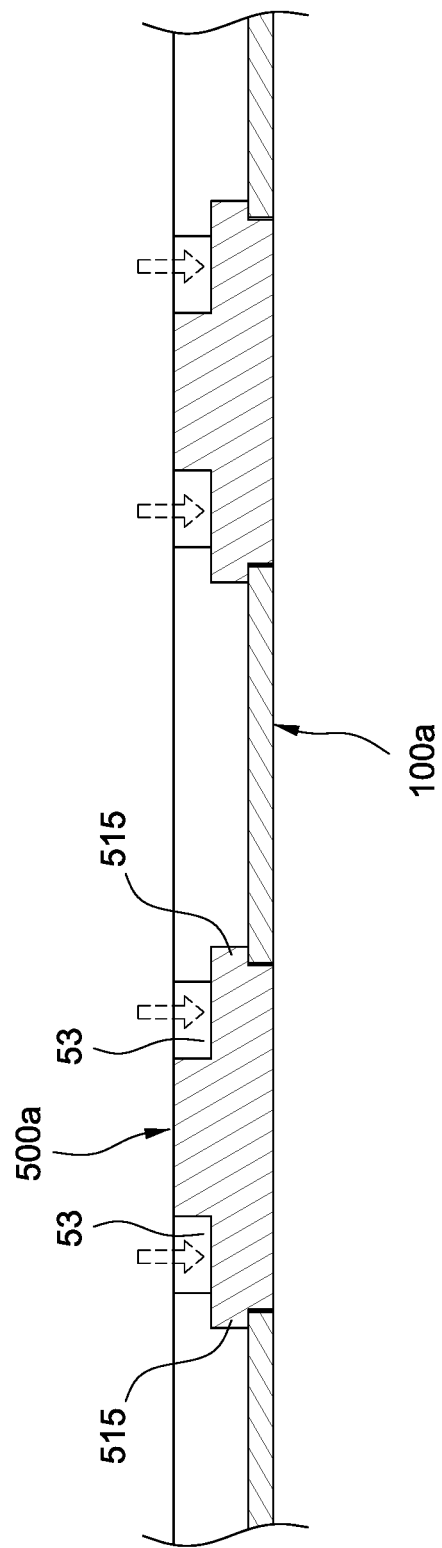
FIG. 12 is a cross sectional view of FIG. 11 being in the mutual blocking status according to the present invention.

After being assembled, each of the bottom convex parts 526 is correspondingly protruded into each of the bottom concave parts 126 for forming a mutual blocking status (as shown in FIG. 14), and each of the top convex parts 515 is abutted against a top surface of the first plate piece 100a for forming a mutual blocking status (as shown in FIG. 12). Accordingly, the first plate piece 100a is blocked by each of the top convex parts 515 arranged above and each of the bottom convex parts 526 arranged below, thereby enabling the first plate piece 100a and the second plate piece 500a to be stably connected.

Figure 10:
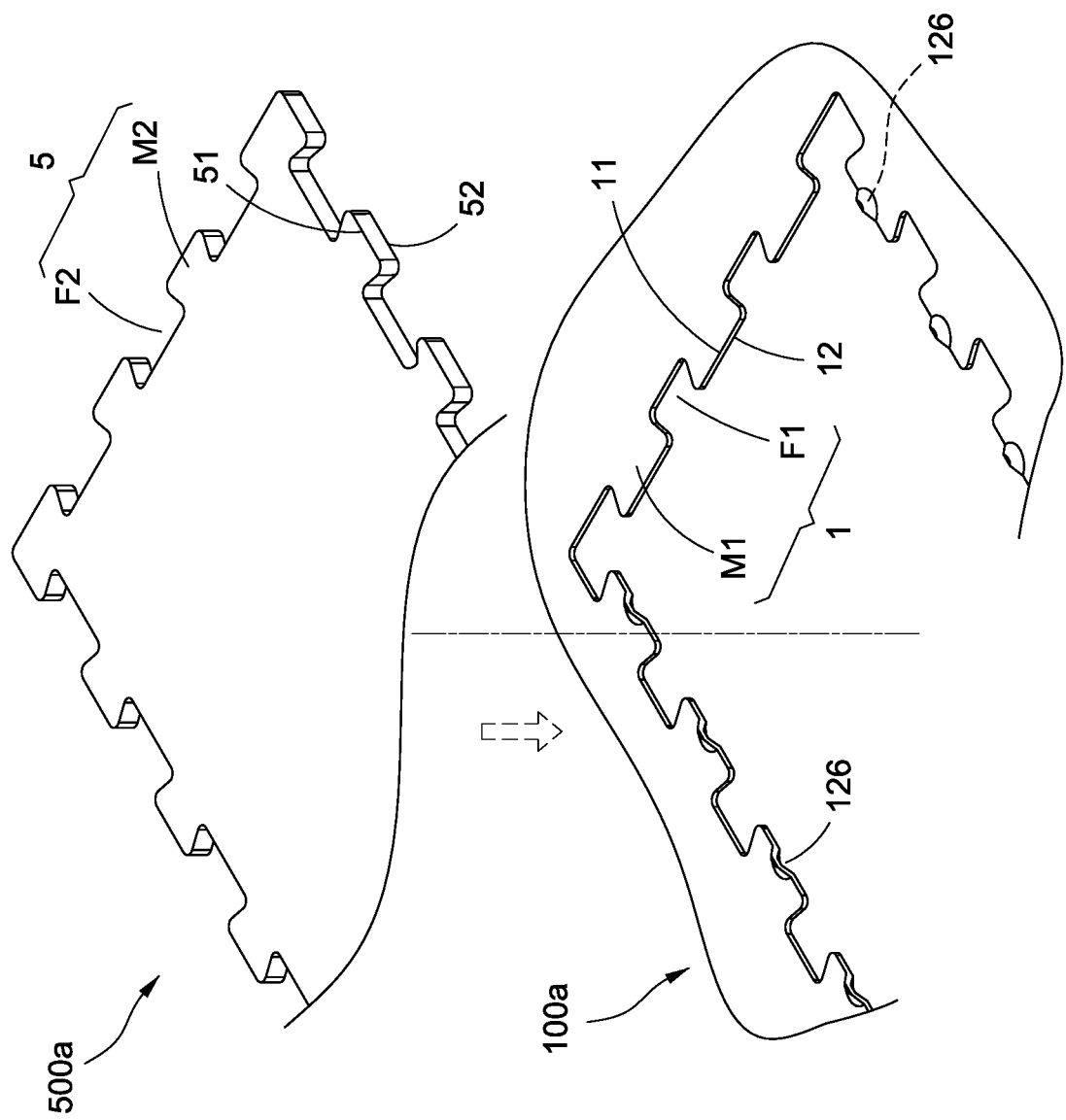
FIG. 10 is a perspective exploded view according to a third embodiment of the present invention.
Figure 11:
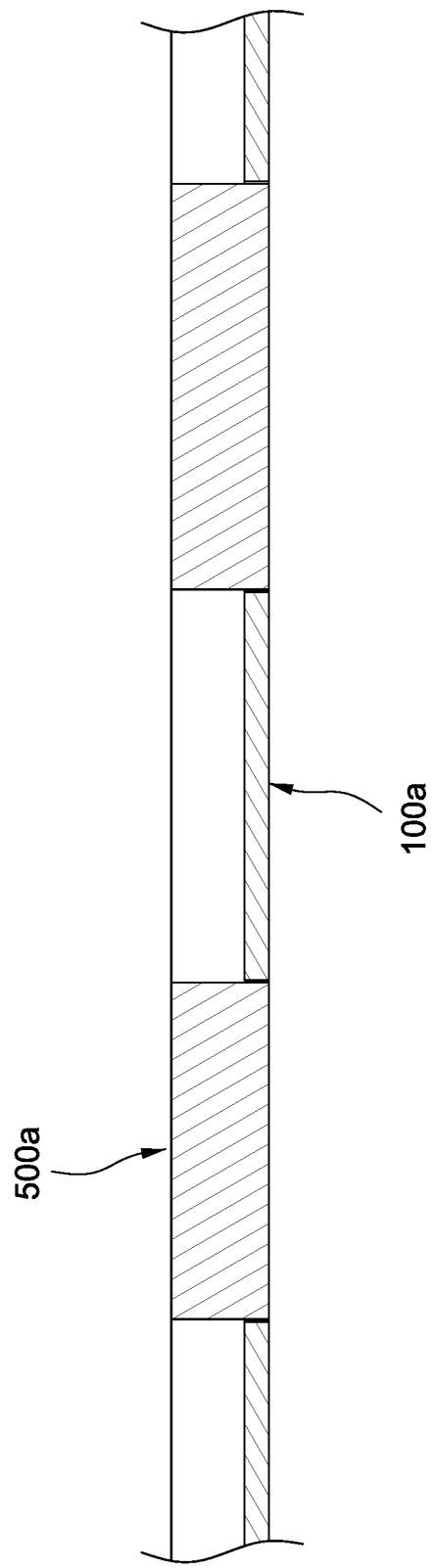
FIG. 11 is a cross sectional view showing an initial assembly wherein a part thereof not being in a mutual blocking status according to the third embodiment of the present invention.
Figure 15:
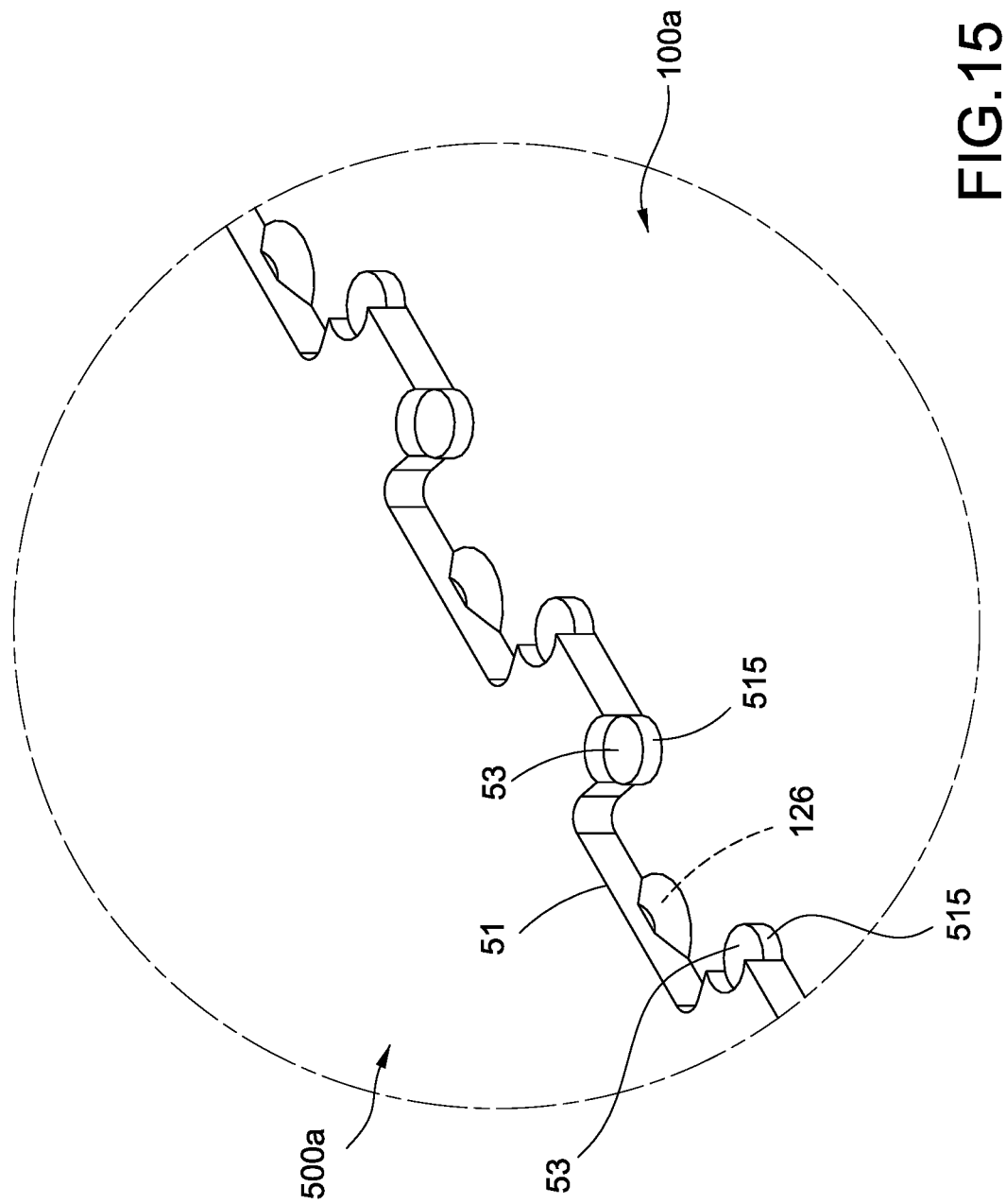
FIG. 15 is a partially enlarged perspective view showing the assembly of FIG. 10 being in the mutual blocking status according to the present invention.

Preferably, the bottom concave parts 126 can be located at partial locations of the first neck-shrinking male member M1 (as shown in FIG. 10); the bottom convex parts 526 can be located at partial location of the second neck-shrinking female member F2; the top convex parts 515 can be located at partial locations of the second neck-shrinking male member M2, as shown in figures, the top convex parts 515 are located at two corners of the second neck-shrinking male member M2 (as shown in FIG. 15).

What shall be addressed is that each of the bottom concave parts 126 is preformed at the first bottom edge 12 (as shown in FIG. 10 and FIG. 13). As such, when the user utilizes a tool to punch the top surface and the bottom surface of the second plate piece 500a, a plurality of the recessed parts 53 are formed on the top surface and the bottom surface of the second plate piece 500a, and the recessed parts 53 can be extruded for correspondingly forming each of the top convex parts 515 and each of the bottom convex parts 526, so that each of the bottom convex parts 526, in a protruding status, is able to be correspondingly protruded into each of the bottom concave parts 126

(as shown in FIG. 13 and FIG. 14), and each of the top convex parts 515, in a protruding status, is able to be abutted against the top surface of the first plate piece 100a.

Based on what has been disclosed above, advantages achieved by the present invention are as follows. The first concave/convex connecting side 1 and the second concave/convex connecting side 5 can be correspondingly connected with a corresponding concave/convex means, in other words each of the neck-shrinking male members (M1, M2) are correspondingly latched in each of the neck-shrinking female members (F1, F2), so that the first plate piece 100, 100a and the second plate piece 500, 500a are prevented from being separated in a length and a width directions (X axis and Y axis); with each of the convex parts (511, 521, 513, 114, 526, 515) being latched in each of the concave parts (111, 121, 113, 514, 126), the first plate piece 100, 100a and the second plate piece 500, 500a can be prevented from being separated in a height direction (Z axis). As such, the first plate piece 100, 100a and the second plate piece 500, 500a made of two different materials can be connected for forming a complete substrate (for example a heat dissipation substrate or other substrate for the purposes other than heat dissipation), and at least one heat dissipation member (for example a heat pipe or a heat spreader but not shown in figures) or at least one heat source (not shown in figures) can be disposed on the first plate piece 100, 100a or the second plate piece 500, 500a.

Moreover, the first plate piece 100, 100a and the second plate piece 500, 500a can be stably connected and prevented from being separated in the length, the width and the height directions, so that the second plate piece 500, 500a having a smaller area can be made of copper which is expensive but has an excellent heat conductivity, and the heat conducting member or the heat source can be adjacently disposed on the second plate piece 500, 500a; the first plate piece 100, 100a having a larger area can be made of other metals (for example iron) which is cheaper but has a relatively poorer heat conductivity, thereby effects of having a good heat conductivity and satisfying economic benefits can be achieved.

Furthermore, each of the convex parts (511, 521, 513, 114, 526, 515) and each of the concave parts (111, 121, 113, 514, 126) are disposed at the partial locations of the neck-shrinking male members (M1, M2) and the neck-shrinking female members (F1, F2), thereby effects of easy in manufacturing process and high yield rate can be provided.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A plate-to-plate connecting structure, including:
   a first plate piece, having a first concave/convex connecting side, wherein the first concave/convex connecting side has a first top edge and a first bottom edge corresponding to a top surface and a bottom surface of the first plate piece, and the first top edge and the first bottom edge have a plurality of top concave parts and a plurality of bottom concave parts; and
   a second plate piece, having a second concave/convex connecting side, wherein the second concave/convex connecting side and the first concave/convex connecting side are connected with a corresponding concave/convex means, the second concave/convex connecting side has a second top edge and a second bottom edge corresponding to a top surface and a bottom surface of the second plate piece, the second top edge and the second bottom edge have a plurality of top convex parts and a plurality of bottom convex parts, each of the top convex parts is protruded from the second top edge and the second bottom edge along a direction parallel to the second plate piece and embedded into each of the corresponding top concave parts for forming a mutual blocking status, and each of the bottom convex parts is protruded into each of the corresponding bottom concave parts for forming the mutual blocking status,
   wherein the second plate piece is processed with a punching operation respectively on the top surface and the bottom surface of the second plate piece perpendicular to the second plate piece to form a plurality of recessed parts as dents on the top surface and the bottom surface of the second plate piece and form extrusions respectively on the second top edge and the second bottom edge in the direction parallel to the second plate piece so as to form each of the top convex parts and each of the bottom convex parts;
   wherein the recessed parts are spaced from the second top edge and the second bottom edge in the direction parallel to the second plate piece and the recessed parts are able to be extruded for correspondingly forming each of the top convex parts and each of the bottom convex parts; and
   wherein each recessed part is a conical cavity, a depth at a periphery of the recessed part is less than a depth at a center of the recessed part, the center of the recessed part is located within the second concave/convex connecting side, and the periphery of each recessed part extends to the top convex part or the bottom convex part, so that a thickness of the top convex part or the bottom convex part is uniform.

2. The plate-to-plate connecting structure according to claim 1, wherein the first concave/convex connecting side has a plurality of first neck-shrinking male members and a plurality of first neck-shrinking female members which are staggeringly arranged; the second concave/convex connecting side has a plurality of second neck-shrinking female members corresponding to the first neck-shrinking male members and a plurality of second neck-shrinking male members corresponding to the first neck-shrinking female members; and the top concave parts, the bottom concave parts, the top convex parts and the bottom convex parts are located at partial locations of the first neck-shrinking male members, partial locations of the first neck-shrinking female members, partial locations of the second neck-shrinking male members and partial locations of the second neck-shrinking female members.

3. The plate-to-plate connecting structure according to claim 1, wherein each of the top concave parts and each of the bottom concave parts are preformed on the first top edge and the first bottom edge.

4. The plate-to-plate connecting structure according to claim 3, wherein the second plate piece is a plate piece having a high extensibility.

5. The plate-to-plate connecting structure according to claim 1, wherein the first plate piece and the second plate piece have a same thickness.

6. The plate-to-plate connecting structure according to claim 1, wherein the first concave/convex connecting side and the second concave/convex connecting side are both formed as a linear connecting side, a bent connecting side or an annular connecting side.

\* \* \* \* \*